United States Patent [19]

Iwata et al.

[11] Patent Number: 5,807,646
[45] Date of Patent: Sep. 15, 1998

[54] SPINEL TYPE LITHIUM-MANGENESE OXIDE MATERIAL, PROCESS FOR PREPARING THE SAME AND USE THEREOF

[75] Inventors: Eiichi Iwata; Ken-ichi Takahashi; Setsuo Yoshida; Masaki Okada; Masanori Sawano, all of Yamaguchi-ken, Japan

[73] Assignee: Tosoh Corporation, Shinnanyo, Japan

[21] Appl. No.: 602,044

[22] Filed: Feb. 15, 1996

[30] Foreign Application Priority Data

Feb. 23, 1995 [JP] Japan .................................. 7-035345
Feb. 23, 1995 [JP] Japan .................................. 7-035346
Jul. 18, 1995 [JP] Japan .................................. 7-202705

[51] Int. Cl.$^6$ .............. C01G 45/12; H01M 4/50
[52] U.S. Cl. .................. 429/224; 264/603; 423/599
[58] Field of Search .................. 423/599; 264/603; 429/224

[56] References Cited

U.S. PATENT DOCUMENTS

| 4,828,834 | 5/1989 | Nagaura et al. | 423/599 |
| 4,959,282 | 9/1990 | Dahn et al. | 423/599 |
| 5,425,932 | 6/1995 | Tarascon | 423/599 |

FOREIGN PATENT DOCUMENTS

| 0 413 313 | 2/1991 | European Pat. Off. . |
| 0 688 739 | 12/1995 | European Pat. Off. . |
| 43 27 760 | 2/1995 | Germany . |
| 63-114065 | 5/1988 | Japan . |
| 63-187569 | 8/1988 | Japan . |
| 63-274059 | 11/1988 | Japan . |
| 2-139860 | 5/1990 | Japan . |
| 2-270268 | 11/1990 | Japan . |
| 2-270269 | 11/1990 | Japan . |
| 3-4445 | 1/1991 | Japan . |
| 3-67464 | 3/1991 | Japan . |
| 3-127453 | 5/1991 | Japan . |
| 3-219556 | 9/1991 | Japan . |
| 198028 | 7/1992 | Japan .................................. 423/599 |
| 2 270 195 | 3/1994 | United Kingdom . |

OTHER PUBLICATIONS

J. Phys. Chem. Solids, vol. 7, pp. 351–360, 1958, D.G. Wickham, et al., "Crystallographic and Magnetic Properties of Several Spinels Containing Trivalent JA–1044 Manganese".

Phillips Research Reports Supplements, vol. 3, pp. 20–25, 1964, G. Blasse, "Crystal Chemistry and Some Magnetic Properties of Mixed Metal Oxides With Spinel Structure".

*Primary Examiner*—Wayne Langel
*Attorney, Agent, or Firm*—Oblon, Spivak, McClelland, Maier & Neustadt, P.C.

[57] ABSTRACT

A novel lithium-manganese oxide composition suitable for use in lithium secondary batteries as an active material for positive electrodes, said oxide having a spinel type crystal structure, an Li:Mn molar ratio of 0.9–1.10:2.00, a mean Mn oxidation number of 3.40–3.60 valencies, and a BET specific surface area of at least 1 $m^2$/g, substantially all the primary particles of said oxide being less than 1 $\mu$m; a process for preparing such an oxide and a lithium secondary battery containing such an oxide are also disclosed.

14 Claims, 1 Drawing Sheet

SPINEL TYPE LITHIUM-MANGENESE OXIDE MATERIAL, PROCESS FOR PREPARING THE SAME AND USE THEREOF

FIELD OF THE INVENTION

This invention relates to a novel lithium-manganese oxide material, a process for preparing the oxide material, and use of the oxide material.

Manganese oxides have been used for a long time as active materials in cells. Recently, lithium-manganese double oxides which are composite substances comprising lithium and manganese are attracting a good deal of attention as active material for lithium secondary batteries.

The lithium secondary batteries are a class of new secondary batteries which are highly expected to be practically utilized as high output, high energy density batteries.

PRIOR ART

As an active material for the positive electrode in a lithium secondary battery, it is required that the active material shows a high voltage working range, a high discharge capacity and a high cycle stability of charge and discharge. Various lithium-containing double oxides, for example, those comprising Li with Co, Ni, Mn, etc., have been investigated as possible choices for such an active material.

It is known that $LiMn_2O_4$, which is one of the lithium-manganese double oxides and has a spinel type structure, discharges in two stages, the first discharge stage being at a level of around 4 volts and the second stage being at a level of around 3 volts. If this double oxide material is operable in reversible discharge-charge cycles within the working range of around 4 volts, it may be expected to obtain high energy therefrom. Thus it has been thought that the above-mentioned double oxide material could be promising as an active material for a positive electrode.

Spinel type lithium-manganese oxides including the above-mentioned $LiMn_2O_4$ have been studied with respect to their magnetic properties and have been known for a long time. For example, D. G. Wickham and W. J. Croft reported part of their study of the magnetic properties of Mn-spinel type structure materials and taught a method for preparing such spinel materials by thermally treating at 800°–900° C. a mixture of lithium carbonate with a manganese oxide having an Li/Mn molar ratio adjusted accurately to 0.5; see J. Phys. Chem. Solids, 7, 351 (1958). Further in the literature (Blasse, G. (1958) Philips Res. Rpts. Chem. Solids, 7, 351), the magnetic properties of $LiMn_2O_4$ and other materials of spinel type structure such as $Li_4Mn_5O_{12}$ are reported and their existence is confirmed.

Accordingly, $LiMn_2O_4$ and the like have been known materials for a long period of time as discussed above. However, only in recent years, it has been intended to apply them as active materials for positive electrodes of lithium secondary batteries.

For example, Japanese Patent Application Laid Open (KOKAI) No. 88-114065 describes an organic electrolyte secondary cell comprising a lithium-containing anode, a cathode consisting essentially of $LiMnO_4$ and an organic electrolyte.

Japanese Patent Application Laid Open (KOKAI) No. 88-187569 teaches a non-aqueous secondary cell which comprises a negative electrode comprising lithium or a lithium alloy as an active material, and a positive electrode comprising, as active material, spinel type $LiMn_2O_4$, λ-manganese dioxide or a manganese oxide or oxides having a crystal structure between those of the above-mentioned two compounds materials.

As methods for preparing lithium-manganese double oxides, in particular $LiMn_2O_4$ and the like, there is a method comprising thermally treating at 800° C.–900° C. a mixture of lithium carbonate with a manganese oxide having an Li/Mn molar ratio adjusted accurately to 0.5 as reported in the above-mentioned article of D. G. Wickham et al.

In addition to the above method, there are several known methods for preparing the double oxides. For example, Japanese Patent Application Laid Open (KOKAI) No. 88-187569 discloses a method in which either $Mn_2O_3$ or $MnO_2$ is mixed with lithium carbonate in an Mn:Li molar ratio of 2:1 and the mixture is calcined in air at 650° C. for 6 hours and subsequently at 850° C. for 14 hours.

Japanese Patent Application Laid Open (KOKAI) No. 91-4445 teaches a method comprising the steps of adding a lithium salt or salts to γ-MnOOH and thermally treating the mixture.

Japanese Patent Application Laid Open (KOKAI) No. 91-67464 describes a method in which a mixture of a manganese oxide selected from $MnO_2$, $Mn_2O_3$ or $Mn_3O_4$ with lithium nitrate ($LiNO_3$) is calcined in air.

Japanese Patent Application Laid Open (KOKAI) No. 91-127453 discloses a method in which manganese dioxide ($MnO_2$) and lithium nitrate ($LiNO_3$) are mixed in an Mn:Li molar ratio in the range of from 2.2:1.0 to 1.8:1.0 and the mixture is calcined in air at a temperature in the range of from 880° C. to 1000° C. to form an oxide material comprising lithium and manganese.

However, it has been difficult to obtain high performance active materials for use in positive electrodes according to the prior art methods as listed above.

After reviewing the prior art methods, the inventors have become aware of an important fact that remains unclear as to which of the physical and chemical properties of $LiMn_2O_4$ could contribute to optimization or enhancement of the performance thereof as an active material for use in a positive electrode.

With reference to further prior art references, it can be seen that some improved methods for preparing lithium-manganese oxides have been proposed; as well, some of the physical and chemical properties of $LiMn_2O_4$ have been found to be contributable to enhancement of the performance thereof as an active material for use in a positive electrode.

For example, Japanese Patent Application Laid Open (KOKAI) No. 88-274059 describes a non-aqueous electrolyte cell which comprises a negative electrode active material comprising mainly of Li, and a positive electrode active material comprising mainly of $LiMn_2O_4$, wherein said $LiMn_2O_4$ shows a diffraction peak at a diffraction angle of 46.1° when subjected to X-ray diffraction with FeKα ray, said peak having a half value width of 1.1° to 2.1°.

Japanese Patent Application Laid Open (KOKAI) No. 90-139860 discloses a non-aqueous electrolyte secondary cell comprising a positive electrode, a lithium ion conductive non-aqueous electrolyte and a negative electrode of lithium or a lithium alloy, wherein said positive electrode is of $LiMn_2O_4$ having a lattice constant a of not greater than 8.22 angstroms.

$Li_xMn_2O_4$ wherein $1.025 \leq x \leq 1.185$, and $Li_xMn_2O_4$ wherein $0.76 \leq x \leq 0.98$ disclosed in Japanese Patent Application Laid Open (KOKAI) Nos. 90-270268 and 90-270269, respectively.

Further, Japanese Patent Application Laid Open (KOKAI) No. 91-219556 describes a lithium secondary cell having a negative electrode of lithium or a lithium alloy, and a positive electrode active material comprising $LiMn_2O_4$ which is in the form of primary particles having a mean diameter of 0.5 μm or less.

However, when the present inventors tested the various prior art lithium-manganese oxides for their suitability for positive electrode active materials of a 4 V-grade (i.e., of a working voltage of about 3.5 V to 4.5 V), it was found, for example, that some of the oxides showed high charge and discharge capacities initially, but they seriously deteriorated with repeated cycles of charge and discharge, or alternatively, that some other oxides showed acceptable levels of cycle stability but suffered from unacceptably low charge and discharge capacities.

Therefore, none of the prior art lithium-manganese oxides appear to show a satisfactory level of cycle stability to be used as positive electrode active materials of lithium secondary batteries without being accompanied by unacceptably low charge and discharge capacities.

SUMMARY OF THE INVENTION

It is an object of the invention to provide a novel lithium-manganese oxide which will perform fully satisfactorily as an active material for the positive electrode of a lithium secondary battery.

It is a further object of the invention to provide a process for preparing such a novel lithium-manganese oxide.

A yet further object of the invention is to provide a lithium secondary battery wherein such a novel lithium-manganese oxide is used as a positive electrode.

As a result of intensive studies and work, it has been realized that, in order to bring out the best performance of lithium-manganese oxide as an active material for the positive electrode of a lithium secondary battery, not only the oxide should be of a single phase crystal structure, but also, importantly, the oxide should have a suitably balanced set of chemical and physical constituents of particle, primary particle diameter and BET specific surface area. It has been also found that the powder properties of lithium-manganese oxide have a significant effect on the performance of a positive electrode prepared therefrom, because, when used as a positive electrode active material, the oxide powder must be used in an intimate mixture with other additives, for example, a conductive material, such as carbon or graphite, a binder, such as polytetrafluoroethylene (PTFE), etc., rather than being used singly.

Thus, with regard to the above objects, the present invention provides a lithium-manganese oxide comprising Li, Mn and O atoms in the molecule, which is characterized by having a spinel type crystal structure, an Li to Mn ratio of from 0.90:2.00 to 1.10:2.00, a mean oxidation number of Mn of from 3.40 to 3.60 and a BET specific surface area of at least 1 m²/g and is further characterized in that substantially all the primary particles thereof are less than 1 μm in size. The invention provides also a process for preparing such a lithium-manganese oxide comprising mixing a manganese compound and a lithium compound together and thermally treating the mixture to form lithium-manganese oxide or oxides, said manganese compound being at least one Mn—O or Mn—O—H compound selected from the group consisting of manganese oxides, manganese oxides hydrates, manganese hydroxides and manganese oxy oxide, said manganese compound being of a spinel type crystal structure. Further the invention provides a high performance lithium secondary battery in which the lithium-manganese oxide according to the invention is utilized as an active material for the positive electrode.

BRIEF DESCRIPTION OF THE DRAWING

The accompanying

DESCRIPTION OF PREFERRED EMBODIMENTS OF THE INVENTION

Figure 1:
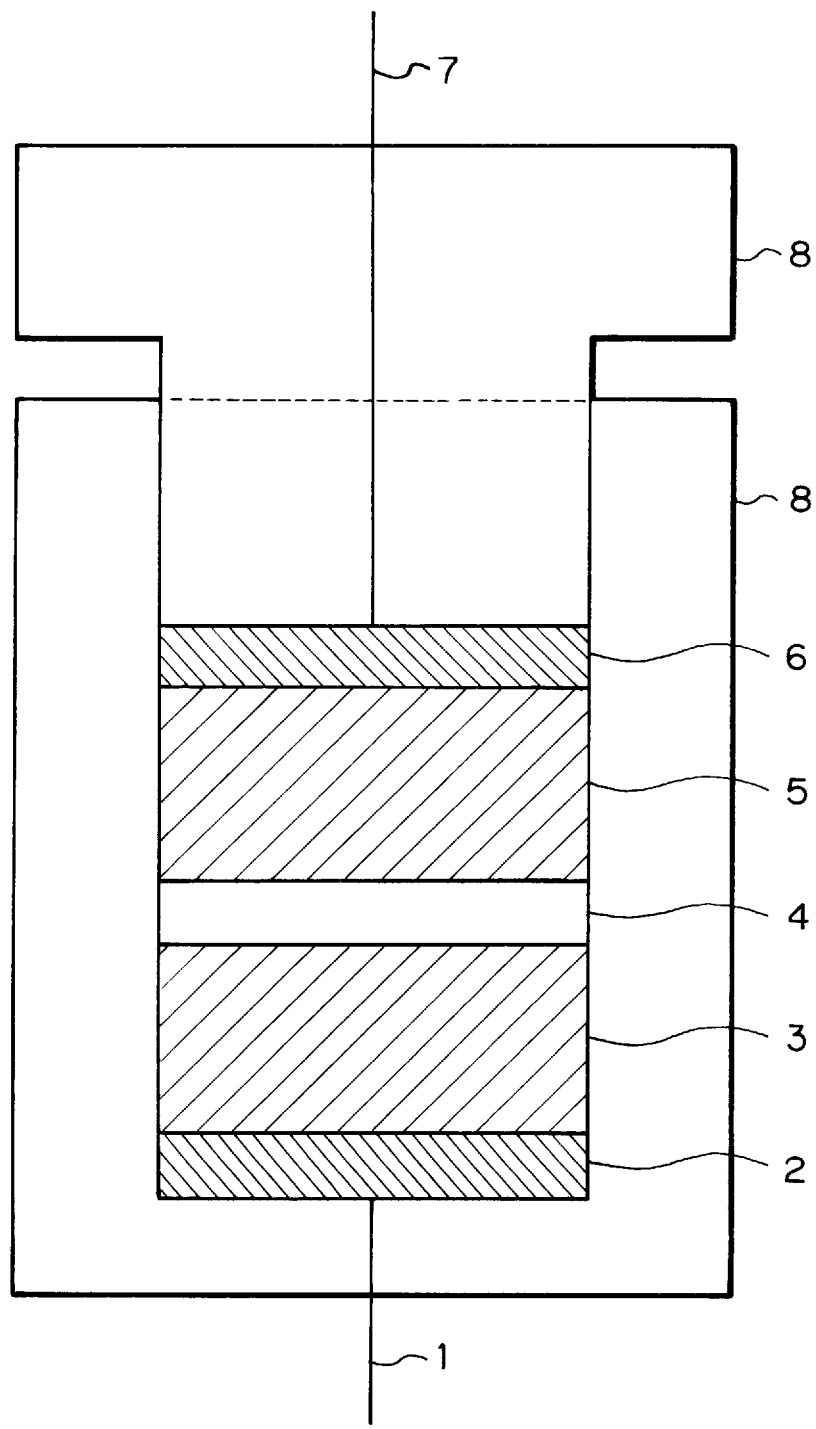
FIG. 1 shows a schematic, sectional plan of a battery assembly in which a lithium-manganese oxide according to the invention is employed as an active material for a positive electrode. The battery consists of a lead wire 1 connected with a positive electrode collector mesh 2, a positive electrode 3, a separator 4, a negative electrode 5, a negative electrode collector mesh 6, a lead wire 7 connected with said collector 6 and a container 8 comprising a vessel and a lid or plug.

The lithium-manganese oxide according to the present invention has a chemical composition and a crystal structure which are substantially common to those of the well-known lithium-manganese spinel oxides, such as $LiMn_2O_4$ and any falling between $LiMn_2O_4$ and $Li_4Mn_5O_{12}$. Further, the specified lithium-manganese oxide of the invention may contain $Mn_2O_3$ in an amount that is little or not detectable by means of X-ray diffraction method. Accordingly, the present lithium-manganese oxide is one consisting of Li, Mn and O atoms, has a spinel type crystal structure, an Li:Mn molar ratio of from 0.90:2.00 to 1.10:2.00 and an Mn average oxidation number of from 3.40 to 3.60.

The powder of the lithium-manganese oxide of the present invention is further characterized in that it has a BET specific surface area of at least 1 m²/g and in that substantially all the primary particles thereof are less than 1 μm.

If the BET specific surface area is less than 1 m²/g, when the oxide is used as a positive electrode, the material tends to work at a decreased rate of utilization and to show a low charge and discharge capacity. Preferably, the upper limit of the BET specific surface area is 10 m²/g.

If the primary particles of the oxide are 1 μm or greater, a positive electrode tends to show a decreased charge and discharge capacity with repeated charge/discharge cycles. Preferably, the lower limit of the primary particle size is 0.01 μm.

The lithium-manganese oxide according to the invention is normally present in the form of agglomerate particles consisting of the above primary particles. The agglomerate particles have a mean particle size in the range of 1–30μ. If the agglomerate particles have a mean size outside of said range, a positive electrode prepared therefrom tends to show an undesirable decrease of charge and discharge capacity either initially or on repeating the charge/discharge cycle.

The crystallographic characteristics of the lithium-manganese oxide according to the present invention are that the oxide has a crystal structure which is identified as a cubic spinel structure, and that, preferably, the crystal has a length of axis a (one of the lattice constants) of in the range of from 8.235 to 8.245 angstroms. Where the length of axis a, one of the lattice constants, is outside of said range and the ratio of tetravalent manganese ions $Mn^{4+}$ to trivalent manganese ions $Mn^{3+}$ present in the crystal structure is remote from 1:1, or at least some of Li, Mn and O atoms do not rest in their proper sites in the crystal structure. These phenomena appear to prevent the oxide material from effectively functioning as an active material for a positive electrode.

Further, the cubic crystallites of the present oxide preferably have a diameter in the range of 400–700 angstroms, with the range of 500–650 angstroms especially preferred. The crystalline size was calculated from the data of X-ray diffraction peak caused by (111) planes of the crystal using the equation of Scherrer.

If the crystalline size unit is smaller than the above-mentioned range, the crystal structure does not grow fully and the resulting imperfect crystal structure will tend to render a poor performance when such an oxide is used as a positive electrode active material. If the crystalline size unit is greater than the above-mentioned range, the above-specified ranges of the powder properties including the size of the primary particle, the mean size of aggregate particles and the BET specific surface area are hardly attainable.

It has been difficult to prepare by conventional methods a lithium-manganese oxide having the physical and chemical properties as specified in the present invention.

In addition, the inventors have studies the tapping density of the oxide powder as a parameter indicating the packing properties thereof.

The lithium-manganese oxide of the invention preferably has a tapping density of at least 1.7 g/cm$^3$, more preferably at least 1.8 g/cm$^3$ and particularly at least 1.9 g/cm$^3$.

If the tapping density is less than the above-specified value, when the oxide is used in preparation of positive electrodes, the oxide could not be well mixed with other materials including a conductor agent, such as carbon or graphite, and a binder, such as polytetrafluoroethylene (PTFE). Further, such a low tapping density material may be packed in less quantity per unit volume due to the correspondingly high bulk.

As aforementioned, though it is difficult to obtain the lithium-manganese oxide of the invention by means of conventional methods, it is more difficult to prepare, by conventional methods, the present oxide that is a fine powder product having the increased tapping density as specified above. According to the invention, it is possible to prepare easily a lithium-manganese oxide fulfilling all the requirements of physical and chemical properties as specified herein.

Thus, the present invention provides a process for preparing such a lithium-manganese oxide, wherein a manganese compound and a lithium compound are mixed together and the resulting mixture is thermally treated to form a lithium-manganese oxide or oxides, said manganese compound being at least one Mn—O or Mn—O—H compound selected from the group consisting of manganese oxides, manganese oxide hydrates, manganese hydroxides and manganese oxy oxides, said starting manganese compound being of a spinel type crystal structure.

It may be presumed that the high performance lithium-manganese oxide material according to the invention could result from the use of the manganese compound of the spinel type crystal structure in which the oxygen atoms rest on the same sites as those of the oxygen atoms in the crystal structure of the desired lithium-manganese oxide product.

Examples of the manganese oxides of spinel structure suitable for use in the invention include $Mn_3O_4$ (a mineral named "hausemannite"); ones containing hydrogen atom or atoms in the structures, e.g., $Mn_3O_{4-x}$ (OH)x, wherein $0<x\leq4$; hydrous crystallite material, i.e., $Mn_3O_4 \cdot nH_2O$; and the like.

The above-mentioned manganese oxide, $Mn_3O_4$ may commonly be prepared by heating an appropriate manganese compound to a temperature of higher than about 900° C. in the presence of oxygen. However, the calcination at such a raised temperature may give rise to a product having an undesirably low specific surface area and require an additional step of pulverization before use.

A preferred method for preparing $Mn_3O_4$ suitable for use in the process of the invention is to prepare the same by oxidizing a manganese hydroxide. The thus resulting $Mn_3O_4$ product is in the form of finely divided particles and is preferred to be used in the process for lithium-manganese oxide according to the invention. Accordingly, in the process of the present invention, such a spinel type manganese oxide which has been prepared by oxidizing a manganese hydroxide may be preferably used as to manganese compound starting material.

As examples of the methods for preparing such a spinel type manganese oxide, a method as disclosed in Japanese Patent Application Laid Open (KOKAI) No. 90-296732 may be mentioned; further, a method for producing a finely divided manganese oxide powder comprising dispersing a metallic manganese powder in an aqueous medium containing at least one selected from the group consisting of water soluble amino acids and ammonium salts and oxidizing the manganese hydroxide formed in the dispersion so as to produce trimanganese tetroxide. Any method wherein a manganese hydroxide compound in an aqueous solution is oxidized to trimanganese tetroxide $Mn_3O_4$ by means of an appropriate oxidant or the like may provide a spinel type manganese oxide material suitable for use in the process according to the invention.

It is also possible to employ, as a spinel type manganese compound in the present process, an oxidic manganese compound having a manganese oxidation number x of not greater than 1.5 where the oxidic compound is expressed provisionally as MnOx.

If the oxidation number is greater than 1.5, then the manganese oxide of spinel structure could permit the presence of $Mn_2O_3$ therein such an amount that a homogeneous lithium-manganese oxide is difficult to form when such a contaminated spinel oxide is reacted with a lithium compound in the present process. Though this has not yet been made fully clear, the spinel type manganese oxide having an oxidation number of greater than 1.5 should not be used in the present process.

The manganese compound of spinel structure to be used in the invention should have a specific surface area of at least 5 m$^2$/g. If the specific surface area of the manganese compound is less than 5 m$^2$/g, such a manganese compound could not react sufficiently with a lithium compound and would give a heterogeneous product, when used in the preparation of lithium-manganese oxide according to the present process.

The lithium compound suitable for use in the present invention is at least one selected from the group consisting of lithium hydroxide, lithium nitrate, lithium chloride and lithium carbonate.

In addition to the above-listed lithium compounds, any other lithium compound which will decompose at the calcination temperature to be used may be employed in the invention. However, lithium nitrate is advantageously employed in the invention, since the desired lithium-manganese can be formed with it at a relatively low calcination temperature. Where any noxious gases, such as NOx or SOx should be prevented from discharging into environment during the calcination stage, then lithium carbonate, lithium hydroxide or lithium hydroxide hydrate may be desirably employed.

In the process of the present invention, the manganese compound and the lithium compound as specified above are mixed together. The molar ratio of Li:Mn in the mixture ranges preferably from approximately 1.0:2.0 to approximately 1.2:2.0. The mixing may be effected in any manner which permits preparation of a homogeneous mixture of the two compounds, for example, by wet mixing or by dry mixing in a ball mill or any suitable mixer. Alternatively, the manganese compound and the lithium compound may be formulated into a slurry, which is then spray-dried to give a homogeneous dry mixture of the compounds.

Subsequently, the mixture is subjected to thermal treatment or calcination to give a desired lithium-manganese oxide product of the invention. In the case where a manganese compound in the specified range according to the invention is employed in combination with, for example, lithium nitrate and the resulting mixture is subjected to thermal treatment in ambient atmosphere, formation of the lithium-manganese oxide product will commence at 260° C., near the melting point of lithium nitrate as determined by X-ray diffractometry. Thus, according to the present method, it is possible to produce the lithium-manganese oxide at lower temperatures than in the cases where the other manganese oxides falling outside the specified range are employed. Accordingly, the present invention provides a process for preparing lithium-manganese oxide which has been considerably improved from the standpoint of energy consumption.

As above-mentioned, according to the present process, though the formation of lithium-manganese oxide may commence at relatively low temperatures, the temperature of thermal treatment preferably ranges from 500° C. to 850° C. to achieve the specified range of high oxidation number of Mn element in the product oxide.

Alternatively and more preferably, the thermal treatment may be carried out in two stages, the mixture being treated at least once at a temperature of not less than 200° C. but less than 500° C. in the first stage and subsequently at a temperature of 500° C. to 850° C. in the second stage. It is especially preferred to subject the mixture to a further mixing or disintegration operation between the first and second thermal treatment stages.

Instead of the employment of such an intervening mixing operation between the two thermal treatment stages, the thermal treatment or calcination may be effected conveniently in a rotary kiln in which the mixture is thermally treated while being tumbled.

Generally, the thermal treatment may be well effected in ambient atmosphere. However, an atmosphere of decreased oxygen concentration, such as of $N_2$, argon, or vacuum, may be advantageously used so as to permit the thermal treatment to be effected at a relatively low calcination temperature.

Further, according to the process of the invention, it is possible to obtain a lithium-manganese oxide product having a tapping density of not less than 1.7 g/cm$^3$ by pressure molding the mixture of manganese compound and lithium compound prior to the thermal treatment.

The pressure molding may be carried out at any appropriate pressure to obtain moldings. However, the pressure molding is effected conveniently at a pressure of at least 500 kg/cm$^2$, especially at least 1 ton/cm$^2$, in order to produce moldings having good form stability and retention properties and which are capable of being handled easily during the subsequent heat treatment; said pressure molding effected at said pressure also produces a final powder product of a tapping density of not less than 1.7 g/cm$^3$. The pressure molded material may be thermally treated similarly to the powder mixture as such. If the pressure molded material is treated at an unduly raised temperature, then the lithium tends to be lost, for example, escaping by evaporation or any other means, thereby causing possibly serious deviations in the composition of the resulting product; further, this could produce primary particles of an undesirably increased mean size. Thus, preferably, the pressure molded material should be thermally treated at 500°–850° C., and particularly at 650°–800° C.

Though also the pressure molded material may be thermally treated at least once at a temperature of at least 200° C. but less than 500° C., mixed again, and then thermally treated at 500°–850°C.; and it is especially preferred that the mixed material after the first thermal treatment is subsequently molded.

The thus resulting lithium-manganese oxide of spinel structure is in the form of agglomerates that are firmer than those of the same oxide prepared by thermal treatment of an unmolded powder mixture, but the former agglomerates may be disintegrated into a fine powder of spinel type lithium-manganese oxide having excellent packing properties.

In the invention, the thus resulting lithium-manganese oxide material of spinel type structure may be used as an active material for a positive electrode.

In the lithium secondary battery according to the invention, either metallic lithium or a substance capable of occluding and emitting lithium ions may be used as an active material for the negative electrode. Examples include metallic lithium, lithium-aluminum alloy, lithium-tin alloy, lithium-lead alloy and carbonaceous materials which are capable of being electrochemically doped with lithium ions and emitting the dopant lithium ions.

The electrolyte which may be used in the present lithium secondary battery is not restricted to any specific one. Examples of the electrolyte useful in the present battery include a liquor containing a lithium salt dissolved in an organic solvent selected from, for example, carbonates, sulfolanes, lactones, ethers and the like; or a solid electrolyte which is lithium-ion-conductive.

Accordingly, the invention provides also a high performance lithium secondary battery using the above-described appropriate positive electrode active material, negative electrode active material and lithium salt-containing non-aqueous electrolyte, said battery being able to work at a voltage as high as approximately 3.5–4.5 V with a high discharge capacity as well as in a stabilized mode of charge and discharge cycles. These high performance properties have not been achieved by the conventional lithium secondary batteries using known lithium-manganese double oxides of spinel type structures as positive electrode active material.

The invention will be further described with reference to the following non-limiting Examples and Comparative Examples.

EXAMPLE

In the Examples, various tests and measurements were carried out as below.

The X-ray diffractional pattern was determined under the conditions of:

| | |
|---|---|
| apparatus: | Model "MXP-3" manufactured by Material Analysis A Characterization Corp. Ltd. |

| | |
|---|---|
| irradiated X-ray: | Cu Kα ray |
| measuring mode: | step scanning |
| scanning | at 0.04° per second |
| measuring time: | three (3) seconds |
| measuring range: | 2θ ranging from 5° to 80° |

The lattice constants were calculated by WPPF (whole powder pattern fitting) method with 2θ=15°–80°.

The crystalline size was calculated by the Scherrer equation.

The chemical composition was analyzed by ICP spectrophotometry.

The Mn element oxidation number was determined by the oxalic acid method.

The primary particle diameter was determined on the SEM (scanning electron microscopic) image of the test specimen.

The secondary particle diameter was determined in a commercially available particle size distribution analyzer "Microtrac" (trade mark; manufactured by Nikkiso Co., Ltd.)

Herein, the term "mean diameter" refers to "mean volume diameter".

The BET specific surface area was determined using nitrogen gas.

The tapping density was determined using:

| | |
|---|---|
| apparatus: | a commercially available apparatus for measuring powder volume reduction by tapping (Model TPM-3 manufactured by Tsutsui Rikagaku Kikai Co., Ltd. |
| conditions: | the density was measured after tapping a specimen for 60 minutes at a tapping rate of 6 times per 10 seconds. |

Synthesis of Lithium-manganese Oxides

Example 1

A commercially available $Mn_3O_4$ having a BET specific surface area of 20 $m^2/g$ and an oxidation number x=1.34 where represented as MnOx (manufactured by Tosoh Co., Ltd. under a trade name "BROWNOX") and lithium nitrate were mixed in an Li:Mn molar ratio of 1.025:2.0 and well ground in a mortar. Then the ground mixture was heated from room temperature to 264° C. over a period of 2.5 hours and held at 264° C. for a further 24 hours in a furnace. The mixture was removed from the furnace and allowed to cool. The mixture was thoroughly mixed again in a mortar and heated to 450° C. over a period of 4.5 hours, held at 450° C. for 24 hours and then allowed to cool. Further the mixture was well mixed in a mortar, and then heated from room temperature to 650° C. over a period of 6.5 hours and held at 650° C. for 24 hours.

The resulting compound already showed, even at the 264° C. stage, an X-ray diffraction pattern similar to that of $LiMn_2O_4$ of JCPDS Card 35-782.

In the product an Li:Mn molar ratio of 1.01:2.0 was found from the analysis thereof, and an Mn oxidation number was calculated to be x=1.75, when represented as MnOx.

The product showed a primary particle diameter of 0.2 $\mu$m and a secondary particle diameter of 16 $\mu$m.

The length of axis a, one of the lattice constants, was 8.242 angstroms and the crystalline size was 580 angstroms.

Example 2

An aqueous manganese nitrate solution (60 mls) of a concentration of 2 moles/$dm^3$ was added to an aqueous lithium hydroxide (500 mls) of a concentration of 2 moles/$dm^3$ under an atmosphere of nitrogen gas. The resulting mixture liquid containing the thus formed manganese hydroxide precipitate was treated with the addition of aqueous hydrogen peroxide, filtered, washed and then dried at 110° C. to give $Mn_3O_4$ having a specific surface area of 30 $m^2/g$.

The $Mn_3O_4$ was mixed with lithium nitrate and thermally treated under the conditions similar to those used in Example 1. The thus resulting compound showed an X-ray diffraction pattern similar to that of $LiMn_2O_4$ of JCPDS (Joint Committee on Powder Diffraction Standards) Card 35-782.

In the compound, an Li:Mn molar ratio of 1.02:2.0 was found from the analysis thereof, and an Mn oxidation number was calculated to be x=1.76, when represented as MnOx.

Example 3

With reference to the method as disclosed in Japanese Patent Application Laid Open (KOKAI) No. 90-296732, 100 g of an Mn powder passing through a 100 mesh sieve was added to 2 $dm^3$ of an aqueous glycine solution of a concentration of 0.25 moles/$dm^3$ while maintaining a temperature of 50° C. With stirring, air was blown into the mixture at a rate of 2 liters per minute for a period of 6 hours. The reacted mixture was passed through a 200 mesh sieve, filtered, washed with water and dried to give an $Mn_3O_4$ powder having a BET specific surface area of 10 $m^2/g$.

This $Mn_3O_4$ material was mixed with lithium nitrate and thermally treated under the conditions as described in Example 1. The resulting product showed an X-ray diffraction pattern similar to that of $LiMn_2O_4$ of JCPDS Card 35-782. In the product, an Li:Mn molar ratio of 1.01:2.0 was found from the analysis thereof, and an Mn oxidation number was calculated to be x=1.74, when represented as MnOx.

Example 4

The procedure of Example 1 was repeated except that lithium hydroxide was used as the lithium source.

The product was similar to that of Example 1. The length of axis a, one of the lattice constants, was equal to 8.239 angstroms and the crystalline size was found to be 570 angstroms.

Example 5

The procedure of Example 1 was repeated except that lithium carbonate was used as the lithium source.

The product was similar to that of Example 1. The length of axis a, one of the lattice constants, was equal to 8.240 angstroms and the crystalline size was found to be 580 angstroms.

Example 6

The lithium source and the Mn source were mixed and ground as described in the initial part of Example 1. The mixture was formed into pellets having a diameter of 20 mm under a pressure of 1 ton/$cm^2$. The pellets were heated from room temperature to 750° C. over a period of 7 hours, held at 750° C. for a further 24 hours, and then allowed to cool to room temperature in 7 hours. The thus thermally treated product was disintegrated in a mortar to give a powdery lithium-manganese oxide product.

The product showed an X-ray diffraction pattern similar to that of $LiMn_2O_4$ of JCPDS Card 35-782. The molar ratio of Li:Mn was calculated to be 1.01:2.0 from the analysis thereof. The Mn oxidation number was calculated to be x=1.76, when represented as MnOx. The product had a tapping density of 1.9 g/cm³.

The length of axis a, one of the lattice constants, was equal to 8.243 angstroms and the crystalline size was 580 angstroms.

Example 7

The procedure of Example 6 was repeated except that lithium hydroxide was used as the lithium source.

The product showed an X-ray pattern similar to that of $LiMnO_4$. From the elemental analysis thereof, the molar ratio of Li:Mn was calculated to be 1.02:2.0. The Mn oxidation number x was equal to 1.77 when represented as MnOx. The tapping density was 1.8 g/cm³.

The length of axis a, one of the lattice constants, was 8.240 angstroms, and the crystalline diameter was 590 angstroms.

Example 8

The general procedure of Example 6 was repeated except that lithium carbonate was used as the lithium source and the pelletizing pressure was 2 tons/cm².

The product showed an X-ray diffraction pattern similar to that of $LiMn_2O_4$. The molar ratio of Li:Mn was calculated to be 1.00:2.00 from the analysis. The Mn oxidation number x was equal to 1.77 when represented as MnOx. The tapping density was 1.8 g/cm³.

The length of axis a, one of the lattice constants, was 8.242 angstroms and the crystalline size was 600 angstroms.

Comparative Example 1

A commercially available manganese source γ-MnOOH having a BET specific surface area of 20 m²/g and an Mn oxidation number x=1.51 as represented as MnOx (manufactured and sold by Tosoh under the trade name "MANGANITE") was thoroughly mixed with lithium nitrate in an Li:Mn molar ratio of 1.025:2.0 in a mortar. The mixture was heated in air from room temperature to 850° C. over a period of 8.5 hours and held at 850° C. for a further 24 hours.

The resulting product showed an X-ray diffraction pattern similar to that of $LiMn_2O_4$ of JCPDS Card 35-782. From the elemental analysis, an Li:Mn molar ratio of 0.99:2.0 was calculated. An Mn oxidation number x=1.74 was obtained as represented as MnOx.

The length of axis a, one of the lattice constants, was 8.248 angstroms, and the crystalline size was 720 angstroms.

Comparative Example 2

The procedure of Example 1 was repeated except that a commercially available γ-MnOOH (as used in the preceding Comparative Example 1) was used in place of the manganese source of Example 1.

Monitoring of the process by means of X-ray diffraction revealed that β-$MnO_2$ was formed at 264° C., a broad peak similar to that of $LiMn_2O_4$ of JCPDS Card 35-782 was observed in the X-ray diffraction pattern at 450° C. and an X-ray diffraction pattern similar to that of $LiMn_2O_4$ of JCPDS Card 35-782 was developed at 650° C. From the elemental analysis, an Li:Mn molar ratio of 1.02:2.0 was calculated and an Mn oxidation number x=1.76 was obtained as represented as MnOx.

The length of axis a, one of the lattice constants was 8.246 angstroms, and the crystalline size was 600 angstroms.

Comparative Example 3

The procedure of Example 1 was repeated except that a commercially available electrolytic manganese dioxide (EMD) having a BET specific surface area of 30 m²/g (manufactured and sold by Tosoh under a trade name "HHU") was used in place of the manganese source of Example 1.

Monitoring of the process by means of X-ray diffraction revealed that an X-ray diffraction pattern specific to the starting EMD material remained at 264° C., indicating formation of no $LiMn_2O_4$. At 650° C., an X-ray diffraction pattern similar to that of $LiMn_2O_4$ of JCPDS Card 35-782 was found. From the elemental analysis, an Li:Mn molar ratio of 1.01:2.0 was calculated. The Mn oxidation number x was 1.77 as represented as MnOx.

The length of axis a was equal to 8.246 angstroms and the crystalline size was 510 angstroms.

Comparative Example 4

The EMD material as used in the preceding Comparative Example 3 was heated at 1000° C. for 24 hours, and then rapidly cooled down to room temperature to synthesize an $Mn_3O_4$ material having a specific surface area of 0.5 m²/g and an Mn oxidation number x=1.32 as represented by MnOx.

The procedure of Example 1 was repeated using the above-synthesized $Mn_3O_4$ in place of the manganese source of Example 1.

Monitoring of the process revealed that an X-ray diffraction pattern specific to the starting $Mn_3O_4$ remained at 264° C., indicating that the reaction mixture behaved very differently from that of Example 1. At 650° C., an X-ray diffraction pattern similar to that of $LiMn_2O_4$ of JCPDS Card 35-782 was observed. From the analysis, the Li:Mn molar ratio was determined to be 1.01:2.0 and the Mn oxidation number x was equal to 1.77 as represented as MnOx.

Comparative Example 5

The procedure of Example 1 was repeated using an $Mn_2O_3$ material having a specific surface area of 3.5 m²/g and an Mn oxidation number x=1.50 (as represented as MnOx) in place of the manganese source of Example 1.

Monitoring by means of XRD reveled that the starting $Mn_2O_3$ remained both at 264° C. and 450° C. At 650° C., an XRD pattern similar to that of $LiMn_2O_4$ of JCPDS Card 35-782 was observed.

From the elemental analysis, the Li:Mn was determined to be 1.03:2.0. The Mn oxidation number was equal to 1.77 as represented as MnOx.

The length of axis a, one of the lattice constants, was 8.246 angstroms, and the crystalline size was 530 angstroms.

Comparative Example 6

The procedure of the preceding Example 6 was repeated with a sequence of thermal treatment comprising heating in air to a temperature of 900° C. over a period of 9 hours, holding at 900° C. for a further 24 hours and subsequently cooling down to room temperature over a period of 9 hours.

The resulting product showed a length of axis a (one of the lattice constants) of 8.250 angstroms and a crystalline size of 740 angstroms.

Comparative Example 7

The procedure of Example 6 was repeated except that a commercially available γ-MnOOH (MANGANITE as used in Comparative Examples 1 and 2) was employed in place of the manganese source of Example 6.

The product showed an XRD pattern corresponding to that of $LiMn_2O_4$. From the elemental analysis, the Li:Mn molar ratio was determined to be 1.00:2.00 and the Mn oxidation number x was equal to 1.76 as represented as MnOx.

The length of axis a, one of the lattice constants was found to be 8.246 angstroms and the crystalline size was 560 angstroms.

The chemical analysis values of the products of all the Examples and Comparative Examples are set forth in Table 1.

TABLE 1

|  | Li:Mn Molar Ratio | Mn Oxidation Number (x) |
|---|---|---|
| Example |  |  |
| 1 | 1.01:2.00 | 1.75 |
| 2 | 1.02:2.00 | 1.76 |
| 3 | 1.01:2.00 | 1.74 |
| 4 | 1.00:2.00 | 1.77 |
| 5 | 1.00:2.00 | 1.75 |
| 6 | 1.01:2.00 | 1.76 |
| 7 | 1.00:2.00 | 1.77 |
| 8 | 1.00:2.00 | 1.76 |
| Comp. Example |  |  |
| 1 | 0.99:2.00 | 1.74 |
| 2 | 1.02:2.00 | 1.76 |
| 3 | 1.01:2.00 | 1.77 |
| 4 | 1.01:2.00 | 1.77 |
| 5 | 1.03:2.00 | 1.77 |
| 6 | 0.92:2.00 | 1.76 |
| 7 | 1.00:2.00 | 1.76 |

The physical properties including primary particle diameter, secondary particle diameter, BET specific surface area, tapping density, length of axis a (a lattice constant), and crystalline size are set forth in Table 2.

TABLE 2

|  | Primary Particle Diameter (A) | Secondary Particle Diameter (A) | BET Specific Surface Area (m²/g) | Tapping Density (g/m³) | Length of Axis a (A) | Crystalline size (A) |
|---|---|---|---|---|---|---|
| 1 | 0.2 | 16 | 5.5 | 1.3 | 8.242 | 580 |
| 2 | 0.3 | 10 | 8.0 | 1.2 | — | — |
| 3 | 0.3 | 12 | 7.5 | 1.3 | — | — |
| 4 | 0.2 | 14 | 5.0 | 1.4 | 8.239 | 570 |
| 5 | 0.2 | 15 | 6.1 | 1.5 | 8.240 | 580 |
| 6 | 0.3 | 11 | 5.8 | 1.9 | 8.243 | 580 |
| 7 | 0.3 | 13 | 6.2 | 1.8 | 8.240 | 590 |
| 8 | 0.3 | 12 | 4.8 | 1.9 | 8.242 | 600 |
| 1 | *4.5 | 40 | 1.9 | 2.1 | 8.248 | 720 |
| 2 | *2.5 | 18 | 5.4 | 1.2 | 8.246 | 600 |
| 3 | 0.1 | 50 | 4.2 | 1.8 | 8.246 | 510 |
| 4 | 0.5 | 45 | 0.2 | 2.0 | — | — |
| 5 | 0.3 | 35 | 3.5 | 1.9 | 8.246 | 530 |
| 6 | 3.5 | 30 | 4.8 | 2.0 | 8.250 | 740 |
| 7 | *4.5 | 49 | 4.7 | 1.4 | 8.246 | 560 |

*an average of the longitudinal diameters of acicular particles
A = angstrom unit Assembling of Battery Each of the lithium-manganese oxides from all the Examples and Comparative Examples was used as a positive electrode active material in a battery as shown schematically in the attached FIGURE.

A lithium-manganese oxide was mixed with a commercially available conductive material (a trade name of TAB-2) comprising a mixture of polytetrafluoroethylene and acetylene black. The weight ratio of the oxide to the conductive material was 2:1. The mixture was formed into a tablet on a disc of mesh sheet (made of SUS 316 and having a diameter of 18 mm) under a pressure of 1 ton/cm². The tablet was vacuum-dried at 200° C. for 24 hours.

In the battery shown in the FIGURE, the above-prepared tablet was used as a positive electrode 3, the mesh functioning as a collector 2.

A negative electrode 5 was made from a lithium disc cut from a 2 mm thick lithium foil. A separator 4 was impregnated with an electrolyte comprising lithium hexafluorophosphate dissolved in propylene carbonate solvent in a concentration of 1 mole/dm³. A negative electrode collector 6 was also prepared from the metal mesh. These components were assembled into the battery having a cross-sectional area of 2.5 cm².

Evaluation of the Batteries

Fifteen batteries prepared using the lithium-manganese oxides from Examples 1–8 and Comparative Examples 1–7 were tested for performance.

The battery was subjected to repeated charge-discharge cycles between the upper voltage of 4.5 V and the lower voltage of 3.5 V at a constant current density of 1.0 mA/cm².

The results of discharge capacity in the first cycle, retention of the discharge capacity (percentage of the discharge capacity in the 20th cycle to the discharge capacity in the first cycle) and tapping density are summarized in Table 3.

TABLE 3

| Oxide from: | Discharge Capacity (1st cycle) (mAh/g) | Retention of Discharge Capacity (%)* | Tapping Density (g/m³) |
|---|---|---|---|
| Example |  |  |  |
| 1 | 126 | 96 | 1.3 |
| 2 | 115 | 93 | 1.2 |
| 3 | 110 | 92 | 1.3 |
| 4 | 125 | 96 | 1.4 |
| 5 | 120 | 93 | 1.5 |
| 6 | 135 | 95 | 1.9 |
| 7 | 121 | 91 | 1.8 |
| 8 | 119 | 90 | 1.9 |
| Comp. Example |  |  |  |
| 1 | 85 | 72 | 2.1 |
| 2 | 105 | 91 | 1.2 |
| 3 | 90 | 90 | 1.8 |
| 4 | 93 | 85 | 2.0 |
| 5 | 100 | 87 | 1.9 |
| 6 | 60 | 60 | 2.0 |
| 7 | 118 | 84 | 1.4 |

*Percentage of the 20th cycle discharge capacity to the first cycle discharge capacity.

As seen in Table 3, the batteries prepared using the lithium-manganese oxides from Examples 1–5 were all of high performance. The batteries based on the Li—Mn oxides from Examples 6–8 also did work as well. The oxides from Examples 6–8 have the advantage that they have increased tapping densities and can be packed in correspondingly increased weight within a given volume of space.

The lithium-manganese oxides which were synthesized conventionally in Comparative Examples 1–7 showed poor discharge capacities and low retentions of discharge capacity, in spite of their generally increased tapping densities.

As above-illustrated, the lithium-manganese oxide material according to the invention is of high performance from the viewpoint of electrochemistry because of its increased discharge capacity and high stability in discharge capacity after repeated charge/discharge cycles, when used as an active material for a positive electrode in lithium secondary batteries. The lithium-manganese oxide having the properties specified in the present invention may be conveniently prepared by mixing a manganese compound of a spinel type structure with an appropriate lithium compound and thermally treating or calcinating the mixture. In the process for preparing the oxide, the starting mixture may be first formed on molded under a pressure and then subjected to the thermal treatment to thereby produce a product which is capable of being packed highly efficiently in a given volume of space. When the lithium-manganese oxide of the invention is used as an active material for a positive electrode in a lithium secondary battery, it is possible to operate the battery in an output voltage range as high as from 3.5 volts to 4.5 volts with an increased discharge capacity and a high stability in discharge capacity even after repeated charge/discharge cycles. These advantages have not been achieved by conventional Li—Mn oxides. It should also be appreciated that the present Li—Mn oxide can be packed efficiently so that this could lead to a lithium secondary battery having a relatively high capacity.

What is claimed is:

1. A lithium-manganese oxide comprising Li, Mn and O which is characterized by having a spinel type crystal structure, an Li to Mn molar ratio of from 0.90:2.00 to 1.10:2.00, a mean oxidation number of Mn of from 3.40 to 3.60 valencies and a BET specific surface area of at least 1 $m^2/g$ and is further characterized in that substantially all the primary particles thereof are less than 1 $\mu m$ in size, said crystal structure being of a cubic system spinel structure having, as a lattice constant, a length of axis a of 8.240–8.245 angstroms.

2. A lithium-manganese oxide as claimed in claim 1 in which said primary particles form agglomerates having a mean particle size of 1–30 $\mu m$.

3. A lithium-manganese oxide as claimed in claim 1 in which a crystallite in said cubic system spinel structure has a crystalline size of 400–700 angstroms.

4. A lithium-manganese oxide as claimed in claim 1 which has a tapping density of not less than 1.7 $g/cm^3$.

5. A process for preparing the lithium-manganese oxide as claimed in any one of claims 1, 2, 3 or 4 which comprises mixing a manganese compound and a lithium compound together and thermally treating the mixture to form said lithium-manganese oxide or oxides, said manganese compound being at least one Mn—O or Mn—O—H compound selected from the group consisting of;

manganese oxides, MnOx, wherein x is not greater than 1.5;

manganese oxide hydrates, (MnOx.nH$_2$O), wherein x is not greater than 1.5;

manganese hydroxides, Mn(OH)x; and manganese oxy oxide, MnOOH.

6. A process according to claim 5 in which the selected manganese compound is of a spinel type crystal structure.

7. A process according to claim 5 in which the selected manganese compound is one having a spinel type structure that has been prepared by oxidizing a manganese hydroxide.

8. A process according to claim 5 in which the selected manganese compound has a spinel type structure and has a BET specific surface area of at least 5 $m^2/g$.

9. A process according to claim 5 in which the lithium compound is at least one member selected from the group consisting of lithium hydroxide, nitrate, chloride and carbonate.

10. A process according to claim 5 in which the thermal treatment temperature is not less than 500° C. but is not greater than 850° C.

11. A process according to claim 5 in which said mixture is subjected at least once to a preliminary thermal treatment at a temperature of not less than 200° C. but less than 500° C. and subsequently subjected to said thermal treatment at not less than 500° C. but not greater than 850° C.

12. A process according to claim 5 in which said mixture is subjected to at least once to a preliminary thermal treatment at a temperature of not less than 200° C. but less than 500° C., then to the mixing procedure again, and thereafter to said thermal treatment at not less than 500° C. but not greater than 850° C.

13. A process according to claim 5 in which after said manganese compound and lithium compound are mixed together, the resulting mixture is molded under pressure and then subjected to said thermal treatment.

14. A lithium secondary battery in which the lithium-manganese oxide as claimed in any one of claims 1, 2, 3 or 4 is employed as an active material for the positive electrode in said battery.

* * * * *

UNITED STATES PATENT AND TRADEMARK OFFICE
CERTIFICATE OF CORRECTION

PATENT NO. : 5,807,646
DATED : September 15, 1998
INVENTOR(S) : Eiichi IWATA, et al.

It is certified that error appears in the above-identified patent and that said Letters Patent is hereby corrected as shown below:

On the title page, item [54] and Col. 1, line 1, should read;

--SPINEL TYPE LITHIUM-MANGANESE OXIDE MATERIAL, PROCESS FOR PREPARING THE SAME AND USE THEREOF--

Signed and Sealed this

Fifteenth Day of December, 1998

*Attest:*

BRUCE LEHMAN

*Attesting Officer*  Commissioner of Patents and Trademarks